United States Patent [19]

Jaerisch et al.

[11] 4,188,124
[45] Feb. 12, 1980

[54] INTERFEROMETRIC MEASURING SYSTEM

[75] Inventors: Walter Jaerisch, Boeblingen; Guenter Makosch, Sindelfingen-Maichingen, both of Fed. Rep. of Germany

[73] Assignee: International Business Machines Corporation, Armonk, N.Y.

[21] Appl. No.: 820,985

[22] Filed: Aug. 1, 1977

[30] Foreign Application Priority Data

Dec. 8, 1976 [DE] Fed. Rep. of Germany ....... 2636211

[51] Int. Cl.² ............................................. G01B 9/02
[52] U.S. Cl. ................................... 356/356; 356/359; 356/371
[58] Field of Search ............... 356/109, 111, 120, 371, 356/359, 356

[56] References Cited

U.S. PATENT DOCUMENTS 3,858,981  1/1975  Jaerisch et al. ..................... 356/111

Primary Examiner—Conrad J. Clark
Attorney, Agent, or Firm—Henry Powers

[57] ABSTRACT

In an interferometric measuring system, a collimated monochromatic and coherent beam of light (1, $I_1$-$I_n$) impinges on a grating 1 disposed parallel to the test surface 2. It has been found that in the above arrangement, a diffraction order (preferably the first diffraction order $S_1$-$S_4$) of the light reflected from the face of the grating opposite to the test surface is always parallel to three diffraction orders of the radiation which after being first diffracted upon its first passage through the grating and reflected from the test surface is again diffracted upon its second passage through the grating. These four radiations ($S_1$ to $S_4$) generate two interference fields, the combination of which generates a beat pattern.

According to the invention, the angle of incidence of the radiation impinging onto the face of the grating opposite to the test surface is chosen in such a way (preferably from 0.5° to 5°) that the areas in which the beat patterns generate an additional field of interference fringes, related to $\lambda/4$ distances, from the test surface are a maximum.

When properly selecting pairs of angles of incidence and of distances between test surface and grating the resolution of the resulting fringe pattern (interference fringes symmetrically interleaved by beat fringes) is improved by the factor of 2, i.e. the distance between two fringes is related to a $\lambda/4$ distance from the test surface, as opposed to the interferometric methods known heretofore where the maximum resolution is defined by fringe distances related to $\lambda/2$ distances from the test surface.

3 Claims, 4 Drawing Figures

INTERFEROMETRIC MEASURING SYSTEM

FIELD OF THE INVENTION

The invention relates to optical interferometric measuring systems and, more particularly, to an interferometric means and process for measurements of distance or flatness utilizing a grating arranged in parallel to a test surface interposed in the path of coherent radiation directed toward said test surface.

DESCRIPTION OF THE PRIOR ART

In industrial processes and in science investigations, interferometric measurements are of great importance. It is known (see e.g. "Fundamentals of Optics" by F. A. Jenkins and H. E. White, McGraw-Hill, pp. 265–267; "Das Interferoskop, ein neues Mittel zum Stadium des Werkzeugverschleisses" by N. Abramson, No. 2/3/70, pp. 83–86; "Advanced Optical Techniques" by A. C. S. Van Heel, North-Holland Publishing Co., 1967, pp. 8–10, pp. 128–129; "Handbuch der Physik", Vol. XXIX, Springer Verlag, 1967, pp. 766, 828–831; "Principle of Optics" by M. Born and E. Wolf, Pergamon Press, pp. 286–289, etc) that the resolution in interferometric measuring methods is determined by the wavelength of the light used. The distances between two interference fringes correspond in an optimum case (vertical light incidence) to a height difference of $\lambda/2$. An increase of the resolution can be achieved by using shorter light waves, by applying immersion processes, by symmetry capture (up to $\lambda/20$), penumbral compensators (up to $\lambda/10,000$), or by photometric processes (up to $\lambda/10,000$).

All these methods, particularly the three last-named ones, are highly complex and can be applied only under specific conditions. The increase of resolution obtained by these methods is always a uniquely defined function of $\lambda/2$.

Also, in applicants' patent, U.S. Pat. No. 3,858,981, issued Jan. 7, 1975, and in their article "Optical Contour Mapping of Surfaces" in the publication Applied Optics, pp. 1551–1557, v.12, n.17, July 1973, a nondestructive optical mapping method is described with adjustable sensitivity for non-contact determination of surface deformations up to 30 $\mu$m/cm. The method employs an optical grating that is placed in front of a test surface. Illumination of the grating by a monochromatic plane wave generates an interference pattern between the beam components of two different diffraction orders. Reflection at the test surface and superposition with the fixed grating generate a fringe pattern that resembles the surface contours of the test object. The fringe pattern consists of a superimposition of an interference line system and a moire line system. Whereas the distance between two adjacent contour lines of the interference pattern corresponds to a surface deformation of a half-wavelength of the illuminating light, the distance between two lines of the moire system is determined by the grid constant and the direction of the grid illumination; and in this manner the scale of measurement can be chosen in accordance with the requirement of the problem involved. The system is illustrated in applications for surface flatness testing of semiconductor wafers and photomasks.

SUMMARY OF THE INVENTION

The invention has for its object the provision of a relatively uncomplicated method of increasing the resolution of interferometric measuring processes, as well as of showing a means for still further increasing the resolution which in part has already been considerably increased by some of the above-mentioned complicated methods.

Compared with the immersion process permitting an increase of resolution of less than fifteen percent, it is possible by means of the method and means herein disclosed, by the invention, to increase the resolution by a factor of 2 with a minimum of operational steps and practically without any restrictions of applicability. The resolution which by means of the above-described processes has already been considerably increased to a level of $\mu/2$, can be improved still further in a relatively simple manner in accordance with the invention to a level of $\mu/4$.

BRIEF DESCRIPTION OF THE DRAWINGS

The invention will be described below in detail by means of the figures which represent the following:

FIG. 1 illustrates the optical beam path of the embodiment presented in FIG. 4. A monochromatic and coherent radiation "I" incident from the left-hand upper side at an angle of $\theta_0$ onto the entire surface of a grating 1 undergoes, at a grating, a reflection diffraction as well as a transmission diffraction. For simplicity and for ease of understanding the figure shows only the diffraction of one single beam $I_1$. It is, however, obvious that the same beam paths appear at each point of the grating. For clearer representation and ease of understanding the individual beams of the path of radiation shown have been given indices showing their generation in accordance with the scheme:

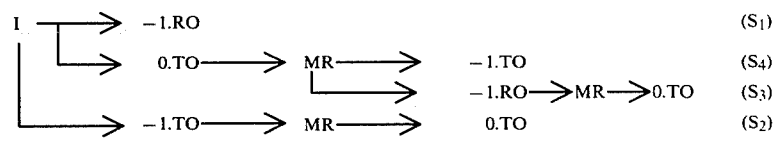

where
1.RO = 1st reflection order
1.TO = 1st transmission order
MR = mirror reflected Thus, beam $I_1$ incident onto grating 1 in a plane vertical to the grating lines, and at an angle $\theta_0$, is reflected not only at the grating surface and diffracted into several orders, but it also passes through the grating and is diffracted simultaneously. A diffraction order which is of interest in connection with the present invention is the 1st reflection diffraction order extending in the direction of the viewer and marked $S_1$, and having the index I,1.RO. The component passing through the grating without being deflected, i.e. the 0'th transmission diffraction order, has the index I,0.TO. After its reflection from test surface 2, the beam has the index I,0.TO-MR (MR meaning mirror reflected), and when passing through the grating it will, inter alia, also be diffracted into the 1st transmission order $S_4$. This beam has the index I,0.TO, MR, 1.TO. Beam I,0.TO, MR reflected from test surface 2, however, is also reflected downwards from grating 1. The diffraction order of interest here is the 1st reflection diffraction order which in FIG. 1 has the index I,0.TO, MR, 1.RO. After its reflection from test surface 2, this beam has the index I,0.TO, MR, 1.RO, MR and is again diffracted when passing through the grating. Diffraction order $S_3$ of interest here has the index I,0.TO, MR, 1.RO, MR, 0.TO. When passing through the grating, beam $I_1$ is diffracted not only into the 0'th transmission diffraction order I,0.TO but also into the 1st transmission diffraction order I,1.TO. This beam is reflected at the test surface and impinges on the grating as a beam with the index I,1.TO, MR. The transmission diffraction order of interest, i.e. the one in parallel with $S_1$, $S_3$, and $S_4$ has the index I,1.TO, MR, 0.TO.

Figure 1:
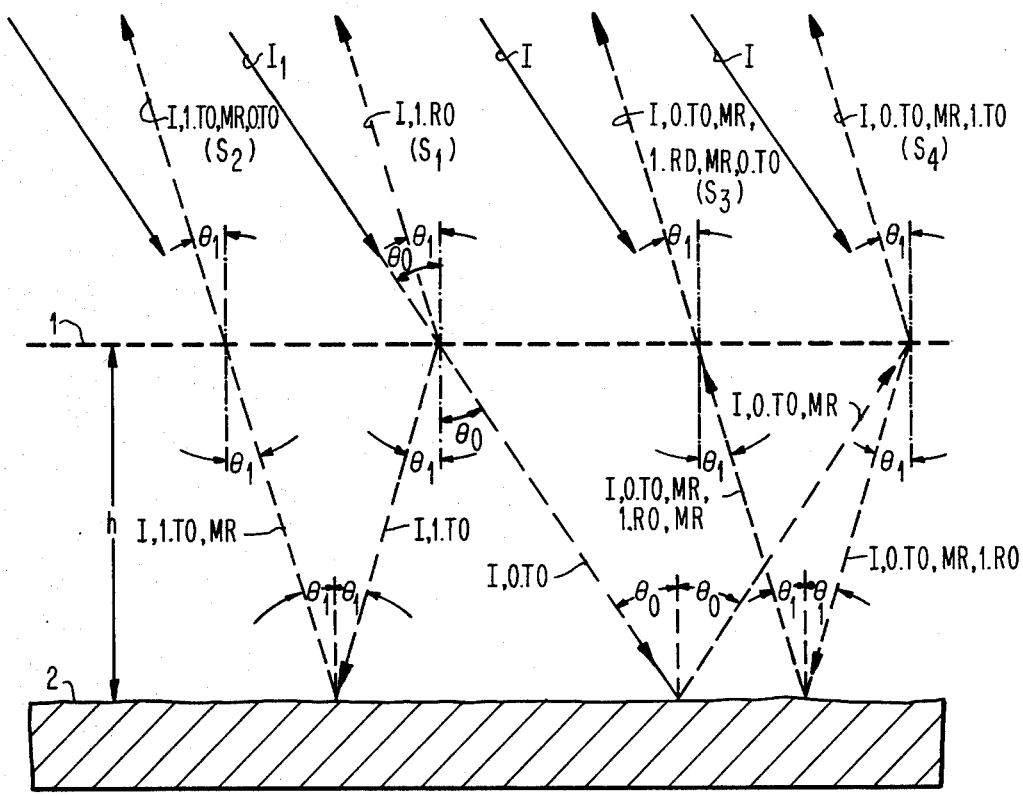
FIGS. 1, 2 and 3 are schematic representations of beam paths and curves explaining the process as disclosed by the invention.
Figure 2:
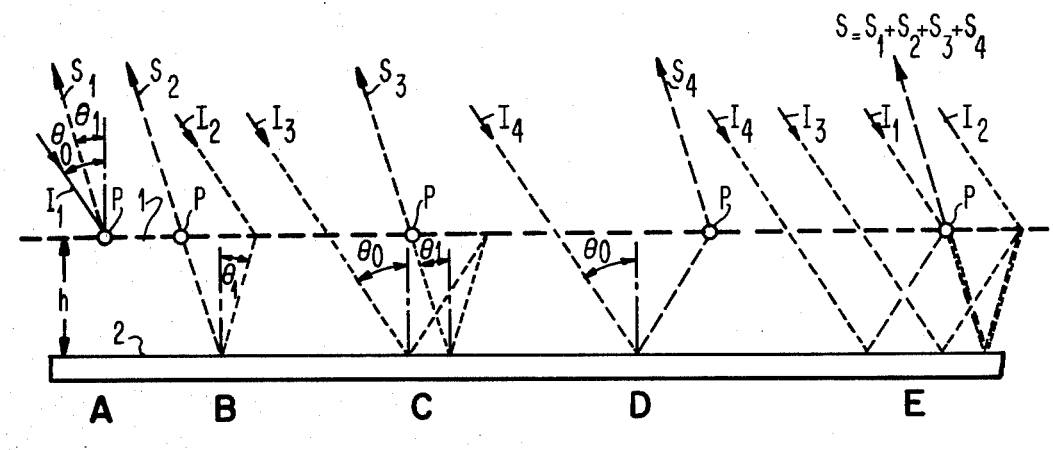

FIG. 2 (points A-D) shows the generation of the individual diffraction orders, each in a separate figure. In FIG. 2 (point A), radiation "I" incident at an angle $\theta_0$ is reflected from grating 1. 1st reflection diffraction order $S_1$ of interest here extends in the direction of the viewer which with the grating normal encloses an angle $\theta_1$. FIG. 2 (points B to D) represent the generation of the remaining three components $S_2$, $S_3$, and $S_4$. For details, reference is made to the description of FIG. 1. FIG. 2 (point E) represents the simultaneous conversion of the beam components marked 1, 2, 3, and 4 of radiation "I" into a radiation S in point P consisting of the four components $S_1$, $S_2$, $S_3$, and $S_4$ shown and explained in the preceding figures, and containing the described beats.

To simplify the description of the drawing, the amplitude of component $S_1$ in FIG. 2 (point A) is discretionary and a phase=0 has been selected. The amplitudes of components $S_2$ to $S_4$ shown in FIG. 2 (points B to D) are obtained from the relations $S_2=S_1 e^{-i2hk \cos \theta_1}$, $S_3=S_1 e^{-i2hk(\cos \theta_0 + \cos \theta_1)}$, and $S_4=S_1 e^{-i2hk \cos \theta_0}$, $k(-2\pi/\lambda)$ being the propagation constant, $\theta_0$ the angle of incidence, $\theta_1$ the diffraction angle, and h the distance between the grating and the test surface. The resulting amplitude is: $S=S_1+S_2+S_3+S_4=S_1(1+e^{-i2hk \cos \theta_1})(1+e^{-i2hk \cos \theta_0})$ The resulting intensity is represented in a slightly different form demonstrating more clearly the presence of a stationary spatial beat:

$$I = \frac{1}{2} |S|^2 \sim (1 + \cosh f_1)(1 + \cosh f_o),$$

where
 $f_1 = 2k \cos \theta_1$, and
 $f_0 = 2k \cos \theta_0$.

With known interference methods, an interference fringe image of the surface to be tested is generated by a coherent superposition of two wavefields (e.g. the applicants' applied article and U.S. Pat. No. 3,858,981, noted above), where one wavefield which is phase-modulated by the surface to be tested is superimposed to a non-influenced wavefield reflected at an "ideal surface". The process described here is based on a coherent superposition of four wavefields. One of them is used as a reference field whereas the other three are phase-modulated by the object to be tested. The thus formed interference fringe image is a fringe system which is very similar to the interference image of the prior methods (noted here) but which provide with a suitable selection of the direction of incidence and of the measuring distance shows a double fringe density. At the object plane, the fringe distance corresponds to a height change of $\lambda/4$.

The generation of these four wavefields results from the description of FIGS. 1 and 2 (points A-E). A plane optical grating 1 with the grating constant "g" is arranged at a medium distance "h" over surface 2 to be tested. The grating is illuminated with a coherent parallel bundle of light I having the diameter of the object to be tested. The angle of incidence in a plane vertical to the plane of the grating and to the grating lines is "$\theta_0$".

The direction of observation is the direction of the first diffraction orders generated by reflection at the grating and forming with the grating normal the angle $\theta_1$. Partial components $S_1$ to $S_4$ (FIGS. 1 and 2 (points A-E) coinciding in a discretionary point P of the grating in direction $\theta_1$ are produced, as indicated above, by the diffraction of the incident light at the grating and by the reflection at the test surface therebeneath. With the general complex representation of a wavefield $$u(\vec{r},t) = Re\{s(\vec{r})e^{i\omega t}\}$$

$$s(\vec{r}) = A(\vec{r})e^{i\gamma(r)} \tag{1}$$

where A=amplitude, $\gamma$ is the phase, and $\vec{r}$ the position vector of P, the partial components coinciding in point P can be described as follows:

$S_1$ = amplitude discretionary, phase=0

$S_2 = S_1 e^{-i2hk \cdot \cos \theta_1}$ $S_3 = S_1 e^{-i2hk(\cos \theta_0 + \cos \theta_1)}$ $S_4 = S_1 e^{-i2hk \cdot \cos \theta_0} \tag{2}$ where $K=2\pi/\lambda$, and $\lambda$ is the wavelength of the light.

In this equation, it is assumed that the real amplitudes of these four partial oscillations are equal, which can be achieved by means of a suitable selection of the characteristics of the diffraction, transmission, and reflection of the grating.

The coherent superposition of these partial components then supplies a resulting wavefield:
$S=S_1+S_2+S_3+S_4=S_1(1+e^{-i2hk \cos \theta_1})(1+e^{-i2hk \cos \theta_1}) \tag{3}$ The intensity of this wavefield in point P results from:

$$I = \frac{1}{2} |S|^2 = \tag{4}$$

$$2 S_1^2 (1+\cos(2hk \cos \theta_1))(1+\cos(2hk \cos \theta_o))$$

The relationship between angle of incidence $\theta_0$ and the angle of diffraction $\theta_1$ is given, according to the diffraction theory, by:

$$\sin \theta_1 = \sin \theta_0 (\pm) \lambda/g \tag{5}$$

g being the grating constant and $\lambda$ the wavelength.

Figure 3:
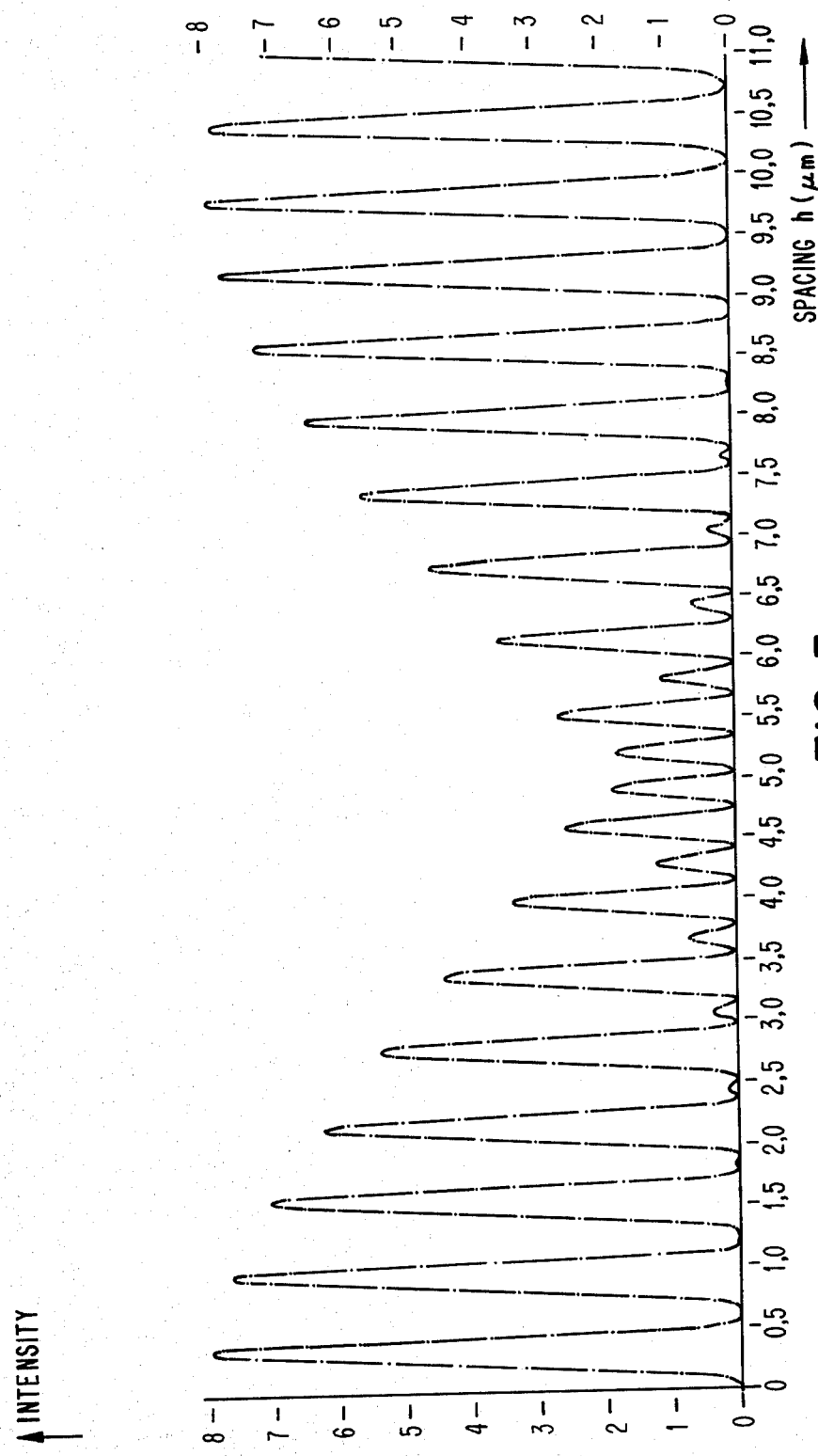

In FIG. 3, the function defined by equation (4) is graphically represented as a function of distance h for the following specific case:

$g = 0.369 \, \mu m$ $\theta_0 = 60°$ $\theta_1 = -57.88°$ $\lambda = 0.6328 \, \mu m$ $h = 0 - 11 \, \mu m$ In order to reach a higher beat period $\Delta$ much smaller values are selected for $\theta_0$ and $\theta_1$ and much higher values are selected for g. (standardization: $I/S_1^2$).

The above specification shows that the intensity resulting in point P due to the overlapping of the four partial components $S_1$–$S_4$ varies, upon a change of the distance h between the grating and the test surface, in accordance with a beat. The zero positions of the beat, the interference fringes, appear at:

$$h = \frac{\lambda}{2} \left( \frac{n+1}{\cos \theta_1} \right) \quad n = 0, 1, 2, 3, \ldots \qquad (6)$$

and/or $$h = \frac{\lambda}{2} \left( \frac{n+1}{\cos \theta_o} \right) \quad n = 0, 1, 2, 3, \ldots$$

If distance h between the grating and the test surface, beginning at h=0, is gradually increased, there appear at first dark interference fringes at the distance of $$\delta_1 = \frac{\lambda}{4} \left( \frac{1}{\cos \theta_1} \right) + \left( \frac{1}{\cos \theta_o} \right) \qquad (7)$$

In the example, $\delta_1 = 0.61 \, \mu m$.

With an increasing h, however, the interference fringes split and show, with $$h = \frac{\lambda}{4 |(\cos \theta_1 - \cos \theta_o)|} \qquad (8)$$

a distance $$\delta_2 = \frac{\delta_1}{2} \qquad (9)$$

The intensity of the maxima decreases to ¼ of the intensity with h=0. With a further increasing h, two adjacent fringes converge again. With $$h = \frac{\lambda}{2 |(\cos \theta_1 - \cos \theta_o)|} \qquad (10)$$

The distance between two successive fringes corresponds again to $\delta_1$. According to equations (5) and (10), the function continues periodically with the beat period $$\Delta = \frac{\lambda}{2 |(\cos \theta_1 - \cos \theta_o)|} = \frac{g}{2 \left| \tan \frac{\theta_o + \theta_1}{2} \right|} \qquad (11)$$

For the beat maxima where the fringe distance is $\delta_1$, there generally applies:

$$h = 2n \cdot \frac{\lambda}{4 |(\cos \theta_1 - \cos \theta_o)|} \quad n = 0, 1, 2, 3, \ldots \qquad (12)$$

The beat minima where the fringe distance is $\delta_2 = (\delta_1/2)$ are defined by $$h = (2n+1) \frac{\lambda}{4 |(\cos \theta_1 - \cos \theta_o)|} \quad n = 0, 1, 2, 3, \ldots \qquad (13)$$

The fringe distance defined by (7) becomes, with small angle of incidence $\theta_0$ and high grating constants (g > 10 $\mu m$), almost $\delta_1 = (\lambda/2)$ This means that the line splitting in the beat minima leads to fringe distances $\delta_2 = (\lambda/4)$ By correspondingly selecting test parameters $\theta_0$ and $\theta_1$, very high beat periods $\Delta$ can be reached in accordance with equation (11). In this manner, the beat minimum over a height range $\Delta h$ (depth of focus) of discretionary size can be extended over the entire test surface. Of a surface to be tested which is arranged under the grating at a medium distance h defined by equation (13), an interference line image with a $\lambda/4$ fringe distance is then produced.

The above specifications are based on the assumption that the interference images are viewed in the direction of the first diffraction order.

The theoretical discussion naturally applies also to other diffraction orders when diffraction angle $\theta_1$ is replaced by the corresponding diffraction angle $\theta_m$.

Figure 4:
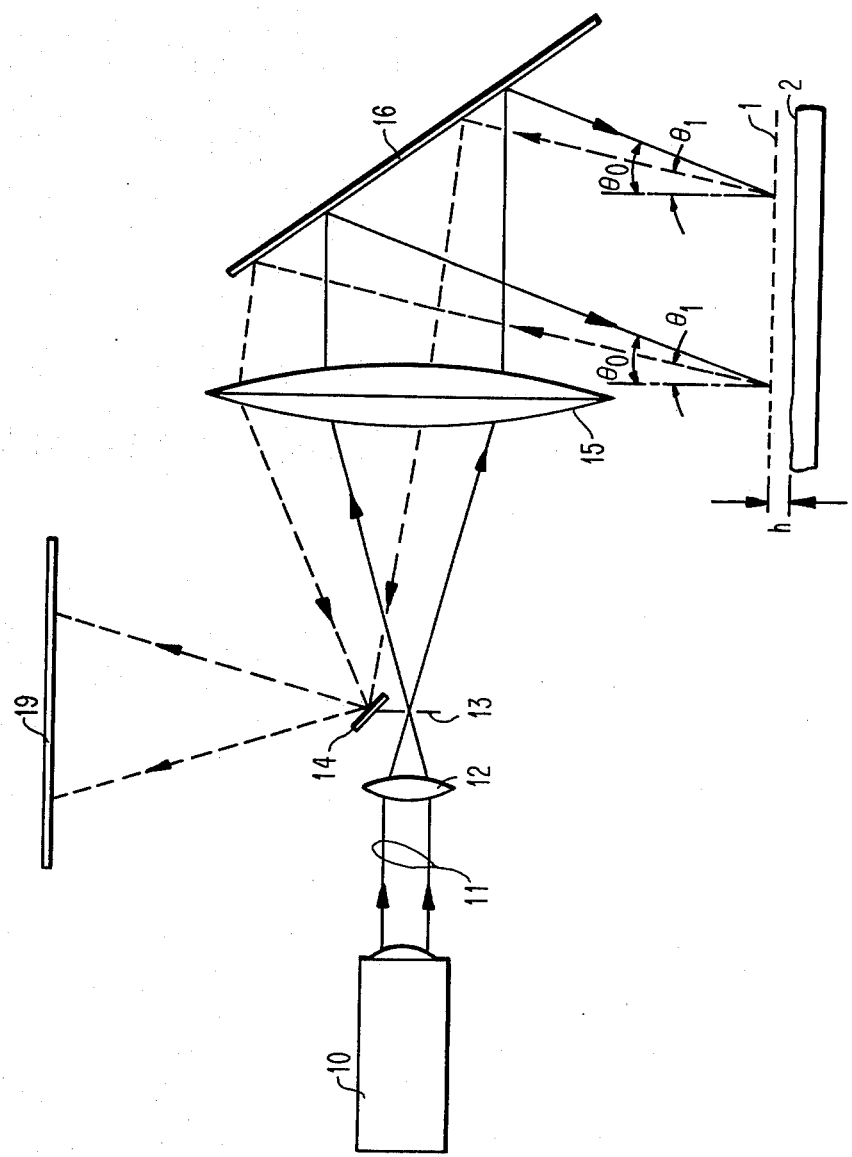
FIG. 4 is a schematic representation of an embodiment of the invention.

In the device shown by FIG. 4, the cross-section of collimated and coherent light beam 11 emanating from a light source 10 (e.g. a helium-neon laser) is passed through a beam expanding means comprising a lens 12, a spatial filter 13, and a lens 15 to the size of the test surface. The collimated and coherent radiation leaving lens 15 in the direction of a mirror 16 impinges at a very small angle $\theta_0$, e.g. $\theta_0 = 1.5°$, on grating 1 having a grating constant of 10 $\mu m$. As shown by FIGS. 1 and 2 (point E) and 3, and as explained in detail in connection with the description of the figures part of the radiation impinging on grating 1 is reflected whereas another part reaches test surface 2 from which, after repeated reflection, as the case may be, between grating and test surface it again passes through the grating in the direction of mirror 16. The arrangement is such that radiation $S_1$ to $S_4$ exiting in the direction of the first reflection diffraction order at an angle $\theta_1$ = approx. 0.75° reaches via mirror 16 lens 15 and is imaged from there via a mirror 14 arranged fixedly or rotatably on an observation screen 19 and/or on the photo-cathode of a vidicon that is not shown. The pattern displayed on observation screen 19 in FIG. 4 consists of interference fringes the mutual distances of which correspond to height differences of $\lambda/4$ on test surface 2.

By the above described method, the formerly existing limits of resolution which practically and theoretically cannot be exceeded of the optical surface interferometry given by $\lambda/2$ fringe distances are improved by a factor of 2. As can be derived from the specification and the discussion of FIGS. 1, 2 (points A–E), and 3, the described method is not restricted to the optical field but can also be applied in acoustics, electronics, and the X-ray field.

While the invention has been particularly shown and described with reference to the preferred embodiments thereof, it will be understood by those skilled in the art that the foregoing and other changes in form and detail may be made therein without departing from the spirit and scope of the invention.

What is claimed is:

1. A method of generating an interference fringe pattern for measurement of irregularities in the evenness of surfaces comprising interposing an optical grating intermediate a source of coherent light and a test surface;

directing said light to said test surface at angle of incidence to generate two interference fields forming a beat pattern in which the light reflected from the grating is combined with parallel rays of radiation diffracted on passage through the grating and reflected from said test surface including portions thereof diffracted on return passage through said grating, and projecting said combined light beams onto an image plane, wherein the grating constant "g", the angle of incidence $\theta_0$, angle of observation $\theta_1$, wavelength $\lambda$ of the beam source "I" and distance "h" between the grating and test surface conform to the relationship $$h = \frac{\lambda}{4\,|(\cos\theta_1 - \cos\theta_o)|}$$

wherein the angle of incidence $\theta 0$ is a function of said grating constant "g" in accordance with the relationship $\sin\theta 0 = \sin\theta_1 \pm g^\lambda$ 2. The method of claim 1 wherein the angle of incidence $\theta_0$ is in the range of 0.05° and 5°

$$\sin\theta_0 = \sin\theta_1 \pm \lambda/g$$

3. A method of generating an interference fringe pattern for measurement of irregularities in the evenness of surfaces comprising interposing an optical grating intermediate a source of coherent light and a test surface;

directing said light to said test surface at angle of incidence to generate two interference fields forming a beat pattern in which the light reflected from the grating is combined with parallel rays of radiation diffracted on passage through the grating and reflected from said test surface including portions thereof diffracted on return passage through said grating, and projecting said combined light beams onto an image plane, wherein the test surface is positioned relative to said grating to provide a minimum beat pattern, and wherein the grating constant "g", the angle of incidence $\theta_0$, angle of observation $\theta_1$, wavelength $\lambda$ of the beam source "I" and distance "h" between the grating and test surface conform to the relationship $$h = \frac{\lambda}{4\,|(\cos\theta_1 - \cos\theta_o)|}$$

wherein the angle of incidence $\theta 0$ is a function of said grating constant "g" in accordance with the relationship $\sin\theta 0 = \sin\theta_1 \pm \lambda/g$

* * * * *

UNITED STATES PATENT AND TRADEMARK OFFICE
CERTIFICATE OF CORRECTION

PATENT NO. : 4,188,124

DATED : February 12, 1980

INVENTOR(S) : Walter Jaerisch et al.

It is certified that error appears in the above-identified patent and that said Letters Patent are hereby corrected as shown below:

Column 7, line 35　　　　　delete "$g^\lambda$" and substitute
Claim 1　　　　　　　　　　-- $\lambda/g$ --.

Column 8, line 2,　　　　　after "5°", insert -- . --.
Claim 2

Column 8, line 4,　　　　　delete "$\sin\theta_o = \sin\theta_1 \pm \lambda/g$".
Claim 2

Signed and Sealed this

Thirtieth Day of September 1980

[SEAL]

Attest:

SIDNEY A. DIAMOND

Attesting Officer　　　　　Commissioner of Patents and Trademarks